Patented Dec. 18, 1923.

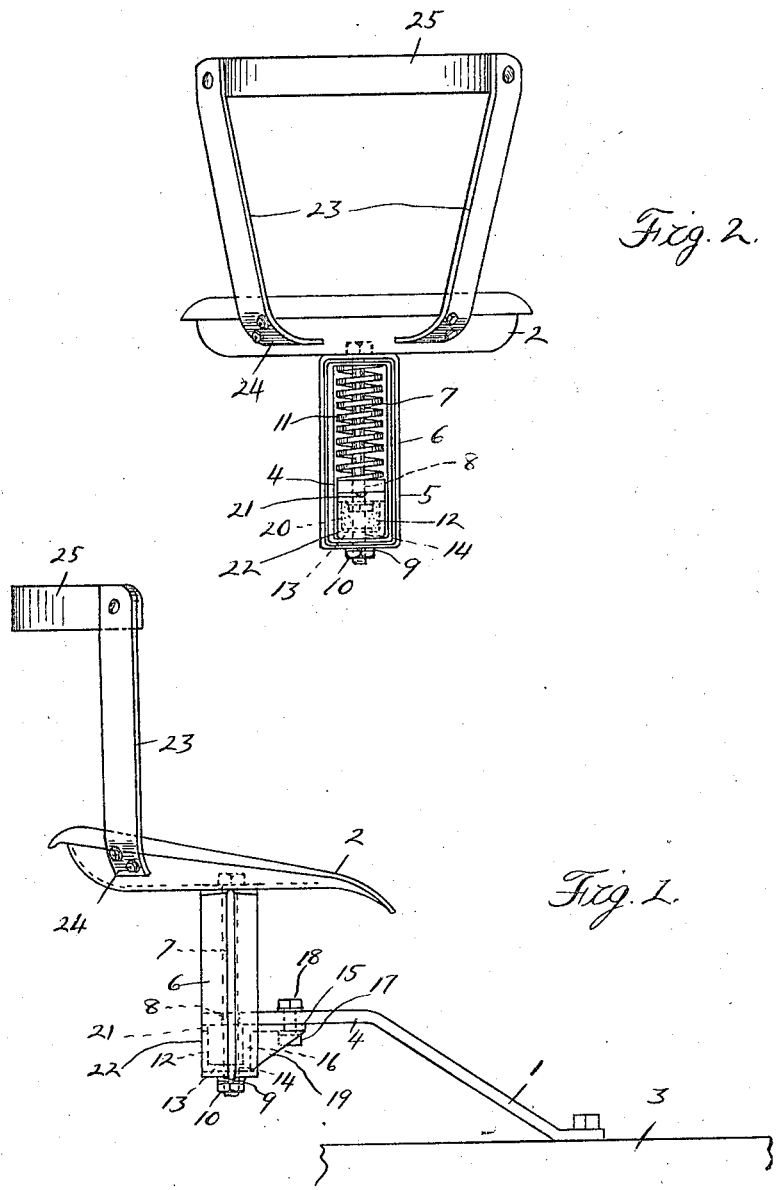

1,477,589

UNITED STATES PATENT OFFICE.

FRANK J. PITCOLE, OF RIVER ROUGE, MICHIGAN, ASSIGNOR TO WHITEHEAD & KALES COMPANY, OF RIVER ROUGE, MICHIGAN, A CORPORATION OF MICHIGAN.

VEHICLE SEAT CONSTRUCTION.

Application filed January 15, 1923. Serial No. 612,756

*To all whom it may concern:*

Be it known that I, FRANK J. PITCOLE, a citizen of the United States of America, residing at River Rouge, in the county of Wayne and State of Michigan, have invented certain new and useful Improvements in Vehicle Seat Constructions, of which the following is a specification, reference being had therein to the accompanying drawings.

This invention relates to seat constructions and refers particularly to constructions which are designed for use upon vehicles.

An object of the invention is to provide a strong and durable seat construction which may be readily attached to or removed from the vehicle and which will absorb the shocks and jars resulting from various causes while the vehicle is in motion.

Another object is to provide a seat with a yieldable back which will also add to the comfort of the rider.

Another object is to provide simple and effective means for lubricating the bolt so as to facilitate the sliding movement thereof.

With the above and other objects in view, the invention consists in certain novel features of construction, combination and arrangement of parts as will be more fully described and particularly pointed out in the appended claims.

In the accompanying drawings.

Figure 1 is a side elevation of a seat construction embodying my invention attached to the transmission housing of a tractor;

Figure 2 is a rear elevation thereof;

Referring now to the drawing in which like characters of reference designate corresponding parts throughout the several views, the numeral 1 designates the usual flat spring for supporting a seat 2. Ordinarily the spring is secured directly to the seat and forms the sole cushioning means therefor, but it has been found that this alone is insufficient to properly cushion the seat when the vehicle is being moved over a rough surface.

With the present invention an additional cushioning element is employed and is adapted to co-operate with the spring 1 to absorb fully all the shocks and jars. In detail, the spring 1 is preferably curved, as shown, intermediate its ends and is preferably attached at its lower end to the transmission housing 3 of a tractor (not shown) although it is apparent that the spring may be any shape desired and may be secured to a suitable part of any vehicle. The horizontal portion 4 of the spring at the upper end thereof extends between the parallel sides 5 of a substantially rectangular-shaped frame 6 which engages the base of the seat 2 and which is mounted on a vertical bolt 7 extending through the base of the seat 2. This bolt is slidably mounted in a vertical opening 8 in the horizontal portion 4 of the spring and extends through the lower end of the frame 6. A suitable lock washer 9 and nut 10 engage the bolt at the lower end thereof and retain the frame in engagement with the seat.

A coil spring 11 surrounds the bolt 7 between the upper end of the frame and the horizontal portion 4 of the spring and is adapted to co-operate with the latter to absorb the shocks and jars and to cushion the seat. A U-shaped member 12 is located between the sides of the frame and is disposed between the horizontal portion 4 of the spring 1 and the lower end of the frame. The base 13 of the U-shaped member is provided with an opening 14 which is in alignment with the opening 8 in the horizontal portion 4 of the spring 1 and which receives the bolt 7, consequently, the bolt will be guided in its movements and the edges of the opening 8 will not bite into or grip the sides of the bolt. A flange 15 extends laterally from one side 16 of the U-shaped member and is detachably secured to the horizontal portion 4 of the spring 1 by means of a suitable bolt 17 and nut 18. A pair of spaced parallel substantially triangular-shaped flanges or braces 19 are preferably formed integral with the flange 15 and the side 16 of the U-shaped member and re-inforce the same.

The U-shaped member is preferably filled lightly with waste 20 or other absorbent material when the seat construction is assembled and this waste is preferably saturated with a suitable lubricant which is supplied through an opening 21 in the side 22 of the U-shaped member to facilitate the sliding movement of the bolt.

A pair of arms 23, preferably constructed of spring metal, are provided with curved portions 24 at their lower ends which are detachably secured to the base of the seat 2 at the opposite sides thereof. A bar 25, also preferably constructed of spring metal, is rigidly secured at its ends to the arms 23 at the upper ends thereof and is preferably curved, as shown, so as to provide a comfortable rest for the back of the rider.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. In a seat construction for vehicles, the combination with a seat, of a frame engaging said seat, a spring carried by said vehicle and extending between the sides of said frame, a bolt securing said frame to said seat, said spring slidably engaging said bolt, yieldable means between said spring and an end of said frame, and a member between said spring and the other end of said frame cooperating with said spring and the sides of said frame to form a housing for lubricant around said bolt, said member being secured to said spring.

2. In a seat construction for vehicles, the combination with a seat, of a frame engaging said seat, a spring carried by said vehicle and extending between the sides of said frame, a bolt securing said frame to said seat, said spring slidably engaging the bolt, yieldable means between said spring and one end of said frame, and a channel-shaped member between said spring and the other end of said frame cooperating with said spring and the sides of said frame to form a housing for lubricant around the bolt, said channel-shaped member being secured to said spring.

3. In a seat construction for vehicles, the combination with a seat, of a frame attached to said seat, a spring carried by said vehicle and extending between the sides of said frame, yieldable means between said spring and one end of said frame, and a member between said spring and the other end of of said frame cooperating with said spring and the sides of said frame to form a housing for lubricant, said member being secured to said spring.

In testimony whereof I affix my signature.

FRANK J. PITCOLE.